(12) United States Patent
Yamauchi et al.

(10) Patent No.: US 7,549,771 B2
(45) Date of Patent: Jun. 23, 2009

(54) LIGHT SOURCE DEVICE AND PROJECTOR

(75) Inventors: Kentaro Yamauchi, Matsumoto (JP); Toshiaki Hashizume, Okaya (JP)

(73) Assignee: Seiko Epson Corporation, Tokyo (JP)

(*) Notice: Subject to any disclaimer, the term of this patent is extended or adjusted under 35 U.S.C. 154(b) by 176 days.

(21) Appl. No.: 11/705,761

(22) Filed: Feb. 14, 2007

(65) Prior Publication Data

US 2007/0189016 A1 Aug. 16, 2007

(30) Foreign Application Priority Data

Feb. 15, 2006 (JP) .............................. 2006-038621

(51) Int. Cl.
*H01J 61/35* (2006.01)
(52) U.S. Cl. .................. 362/264; 362/263; 362/296; 362/261
(58) Field of Classification Search ................. 362/261, 362/263, 296
See application file for complete search history.

(56) References Cited

U.S. PATENT DOCUMENTS

| | | | |
|---|---|---|---|
| 6,642,655 B2 | 11/2003 | Matsumoto et al. | |
| 7,281,968 B2 | 10/2007 | Takado | |
| 2004/0021418 A1 | 2/2004 | Takahashi et al. | |

FOREIGN PATENT DOCUMENTS

| | | |
|---|---|---|
| CN | 1700084 A | 11/2005 |
| JP | A 08-031382 | 2/1996 |
| JP | A 10-134767 | 5/1998 |
| JP | A 2001-243912 | 9/2001 |
| JP | A 2002-150999 | 5/2002 |
| JP | A 2004-031153 | 1/2004 |
| JP | A 2005-005183 | 1/2005 |
| JP | A 2005-148293 | 6/2005 |
| JP | A 2005-285507 | 10/2005 |

*Primary Examiner*—Anabel M Ton
(74) *Attorney, Agent, or Firm*—Oliff & Berridge, PLC

(57) ABSTRACT

A light source device includes: a light source lamp having a light-emitting tube with a discharge space and a pair of electrodes disposed in the discharge space of the light-emitting tube; a reflector extending in a substantially concave shape in section, the reflector reflecting a light beam irradiated from the light source lamp; and a sub-reflection mirror having a reflection surface that is disposed to face a reflection surface of the reflector, the sub-reflection mirror reflecting a part of the light beam irradiated from the light source lamp toward the discharge space. The light-emitting tube has a light-emitting section having the discharge space therein and sealing sections provided on both sides of the light-emitting section. The sub-reflection mirror is formed in a shape of a bowl that covers the light-emitting section of the light-emitting tube, the sub-reflection mirror having an opening for mounting the sub-reflection mirror to the light-emitting tube by allowing one of the sealing sections of the light-emitting tube to be inserted thereinto. A heat insulating member is provided to at least a part of the light-emitting section and the other one of the sealing sections of the light-emitting tube.

10 Claims, 3 Drawing Sheets

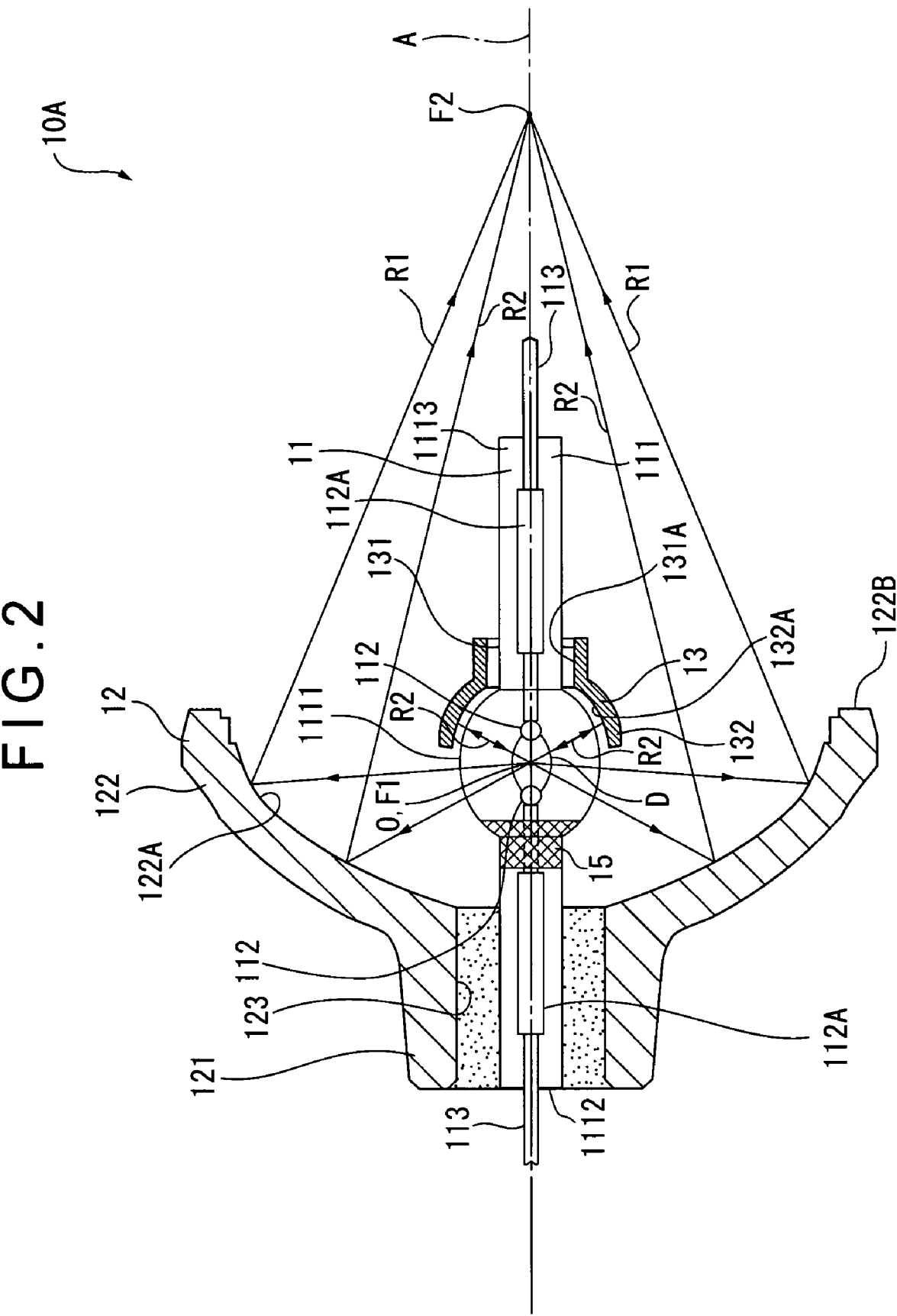

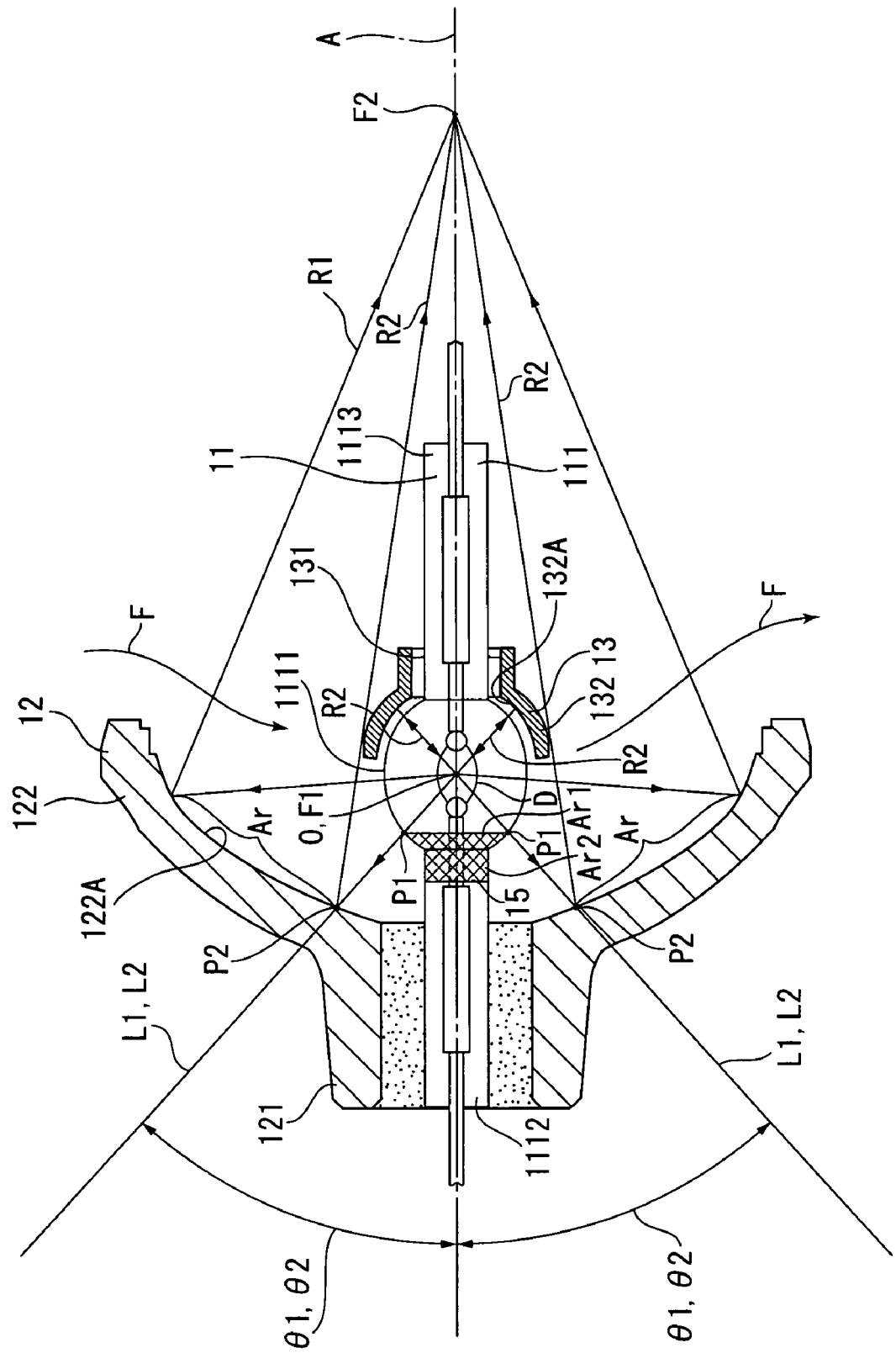

LIGHT SOURCE DEVICE AND PROJECTOR

The entire disclosure of Japanese Patent Application No. 2006-038621, filed Feb. 15, 2006, is expressly incorporated by reference herein.

BACKGROUND

1. Technical Field

The present invention relates to a light source device and a projector.

2. Related Art

There has been used a projector for modulating a light beam irradiated from a light source in accordance with image information to and project an optical image in an enlarged manner.

As a light source device of the projector as described above, there has also been known a arrangement having a discharge type light source lamp such as a metal halide lamp and a high pressure mercury lamp, a reflector for reflecting a light beam irradiated from the light source lamp, and a sub-reflection mirror for reflecting the light beam irradiated forward from the light source lamp toward a side of the reflector (see, for instance, Document: JP-A-2005-148293).

Meanwhile, when the sub-reflection mirror is mounted to the light source lamp like the light source device disclosed in Document, temperature of the light source lamp tends to be high as compared to an arrangement in which no sub-reflection mirror is provided, because, for example, the light source lamp is affected by heat generated in the sub-reflection mirror by the light beam irradiated thereto and because radiation of heat generated in the light source lamp is restricted by the sub-reflection mirror. More specifically, the temperature of the light source lamp on a side on which the sub-reflection mirror is mounted becomes higher than temperature on a side opposite to the side on which the sub-reflection mirror is mounted, which causes temperature distribution of the light source lamp to be biased. When cooling is reinforced by forced cooling or the like to lower the temperature of the light source lamp, temperature of the side opposite to the side on which the sub-reflection mirror is mounted may lowered more than necessary and may cause a so-called blackening phenomenon by which an evaporated electrode material adheres to an inner wall of the light source lamp (a light-emitting tube). The blackening phenomenon described above may induce a drop of illuminance or breakdown of the light source lamp.

Accordingly, a technique has been desired to prolong a life of the light source device by reducing the bias of the temperature distribution of the light source lamp and avoiding the drop of illuminance and breakdown of the light source lamp in the arrangement in which the sub-reflection mirror is mounted to the light source lamp.

SUMMARY

An advantage of some aspects of the invention is to provide a light source device capable of prolonging a life of a light source lamp by reducing bias of temperature distribution of the light source lamp and avoiding a drop of illuminance and breakdown of the light source lamp in an arrangement in which a sub-reflection mirror is mounted to the light source lamp, and a projector using the same.

A light source device according to an aspect of the invention includes: a light source lamp having a light-emitting tube with a discharge space and a pair of electrodes disposed in the discharge space of the light-emitting tube; a reflector extending in a substantially concave shape in section, the reflector reflecting a light beam irradiated from the light source lamp; and a sub-reflection mirror having a reflection surface that is disposed to face a reflection surface of the reflector, the sub-reflection mirror reflecting a part of the light beam irradiated from the light source lamp toward the discharge space. The light-emitting tube has a light-emitting section having the discharge space therein and sealing sections provided on both sides of the light-emitting section. The sub-reflection mirror is formed in a shape of a bowl that covers the light-emitting section of the light-emitting tube, the sub-reflection mirror having an opening for mounting the sub-reflection mirror to the light-emitting tube by allowing one of the sealing sections of the light-emitting tube to be inserted thereinto. A heat insulating member is provided to at least a part of the light-emitting section and the other one of the sealing sections of the light-emitting tube.

Here, a parabolic reflector or an ellipsoidal reflector may be employed as the reflector.

The heat insulating member may be connected mechanically to the light-emitting tube or may be formed as a film which is applied to an outer wall surface of the light-emitting tube.

According to the aspect of invention, the heat insulating member is provided to at least a part of a light-emitting section of the light-emitting tube and a sealing section on the side opposite to a sealing section where the sub-reflection mirror is mounted out of the pair of sealing sections. Accordingly, heat of the side opposite to the side on which the sub-reflection mirror is mounted can be insulated by the heat insulating member in the light-emitting tube. Therefore, even when cooling is reinforced by forced cooling or the like to lower temperature of the light source lamp, it becomes possible to prevent the temperature of the side opposite to the side on which the sub-reflection mirror is mounted from dropping more than necessary, and to reduce a level of the bias of the temperature distribution of the light source lamp. Accordingly, it becomes possible to avoid a blackening phenomenon from occurring in the light source lamp, thereby prolong a life of the light source device.

In the light source device according the aspect of the invention, it is preferable that the heat insulating member is provided to the at least a part of the light-emitting section and the other one of the sealing sections of the light-emitting tube so as to satisfy a relationship of $\theta 1 \leq \theta 2$, where $\theta 1$ represents an angle formed by a straight line and a central axis of the light beam irradiated from the light source lamp on a light-irradiation rear side, the straight line connecting a light-emitting center of the light source lamp and a heat insulating critical point of the heat insulating member, the heat insulating critical point located apart with a largest distance from the central axis of the light beam irradiated from the light source device and located closest to the light-emitting center, and $\theta 2$ represents an angle formed by a straight line and the central axis on the light-irradiation rear side, the straight line connecting a reflection critical point which is located closest to the central axis in a utilized light reflecting area of the reflector and the light-emitting center.

Here, the utilized light reflecting area is an area set by outer dimensions of the sub-reflection mirror and the light-emitting tube, focal distances of the reflector, and the like. More specifically, the utilized light reflecting area is an area for reflecting the light beam irradiated from the light-emitting section to objects to be illuminated as illuminable utilized light. In other words, it is an area for reflecting the light beam irradiated from the light-emitting section to the objects to be illuminated as the illuminable utilized light without being blocked by the light-emitting tube or the sub-reflection mirror even when the light beam are reflected by the reflector.

Incidentally, when the heat insulating member is provided to the light-emitting tube so as to satisfy the relationship of $\theta_1 > \theta_2$ that does not satisfy the relationship of $\theta_1 \leq \theta_2$ described above, the utilized light of the light beam irradiated from the light-emitting section is blocked by the heat insulating member, which may impede improvement of utilization efficiency of the light irradiated from the light source device.

According to the aspect of invention, the heat insulating member is provided to the light-emitting tube so as to satisfy the relationship of $\theta_1 \leq \theta_2$. With the arrangement, the utilized light of the light beam irradiated from the light-emitting section is not blocked by the heat insulating member, so that the improvement of the utilization efficiency of the light irradiated from the light source device is not impeded.

In the light source device according to the aspect of the invention, it is preferable that the heat insulating member is provided to at least the light-emitting section.

According to the aspect of the invention, the heat insulating member is provided at the light-emitting section where the temperature becomes highest in the light-emitting tube. Therefore, the heat insulating member can effectively insulate the heat of the side opposite to the side on which the sub-reflection mirror is mounted in the light-emitting tube and can effectively suppress the reduction of temperature on the side opposite to the side on which the sub-reflection mirror is mounted even when cooling is reinforced by forced cooling or the like.

In the light source device according to the aspect of the invention, it is preferable that the heat insulating member absorbs an incident light beam and radiation heat.

According to the aspect of the invention, the heat insulating member absorbs the incident light beam and the radiation heat. Accordingly, at a position to which the light beam irradiated from the light-emitting section is irradiated and the radiation heat is radiated (e.g., on a surface of the light-emitting section), the temperature of the heat insulating member becomes high by absorbing the irradiated light beam and the radiation heat, thereby reducing an amount of heat transferred from the light-emitting tube to the heat insulating member. Therefore, it becomes possible to more effectively suppress the temperature drop of the side opposite to the side on which the sub-reflection mirror is mounted in the light-emitting tube.

In the light source device according to the aspect of the invention, it is preferable that the heat insulating member has a thermal conductivity smaller than that of the light-emitting tube According to the aspect of the invention, the heat insulating member has a thermal conductivity smaller than a thermal conductivity of the light-emitting tube, which can effectively keep high temperature of a region where the heat insulating member is provided on the surface of the light-emitting tube. Therefore, even when cooling is reinforced by forced cooling or the like in the light-emitting tube, the temperature drop of the side opposite to the side on which the sub-reflection mirror is mounted can be effectively suppressed.

According to another aspect of the invention, a projector includes: a light source device; an optical modulator that modulates light beam irradiated from the light source device in accordance with image information; and a projection optical device that projects the light beam modulated by the optical modulator in an enlarged manner, in which the light source device is the light source device which is described in the preceding paragraphs.

According to the aspect of the invention, since the projector has the light source device described above, the same advantages and effects as the light source device can be attained.

BRIEF DESCRIPTION OF THE DRAWINGS

The invention will be described with reference to the accompanying drawings, wherein like numbers reference like elements.

FIG. 2 is a sectional view showing an outline of a light source device body according to the exemplary embodiment of the invention; and FIG. 3 is a diagram for explaining a mounting position of a heat insulating member and a flow path of air circulating within the light source device according to the exemplary embodiment of the invention.

DESCRIPTION OF EXEMPLARY EMBODIMENT(S)

Figure 1:
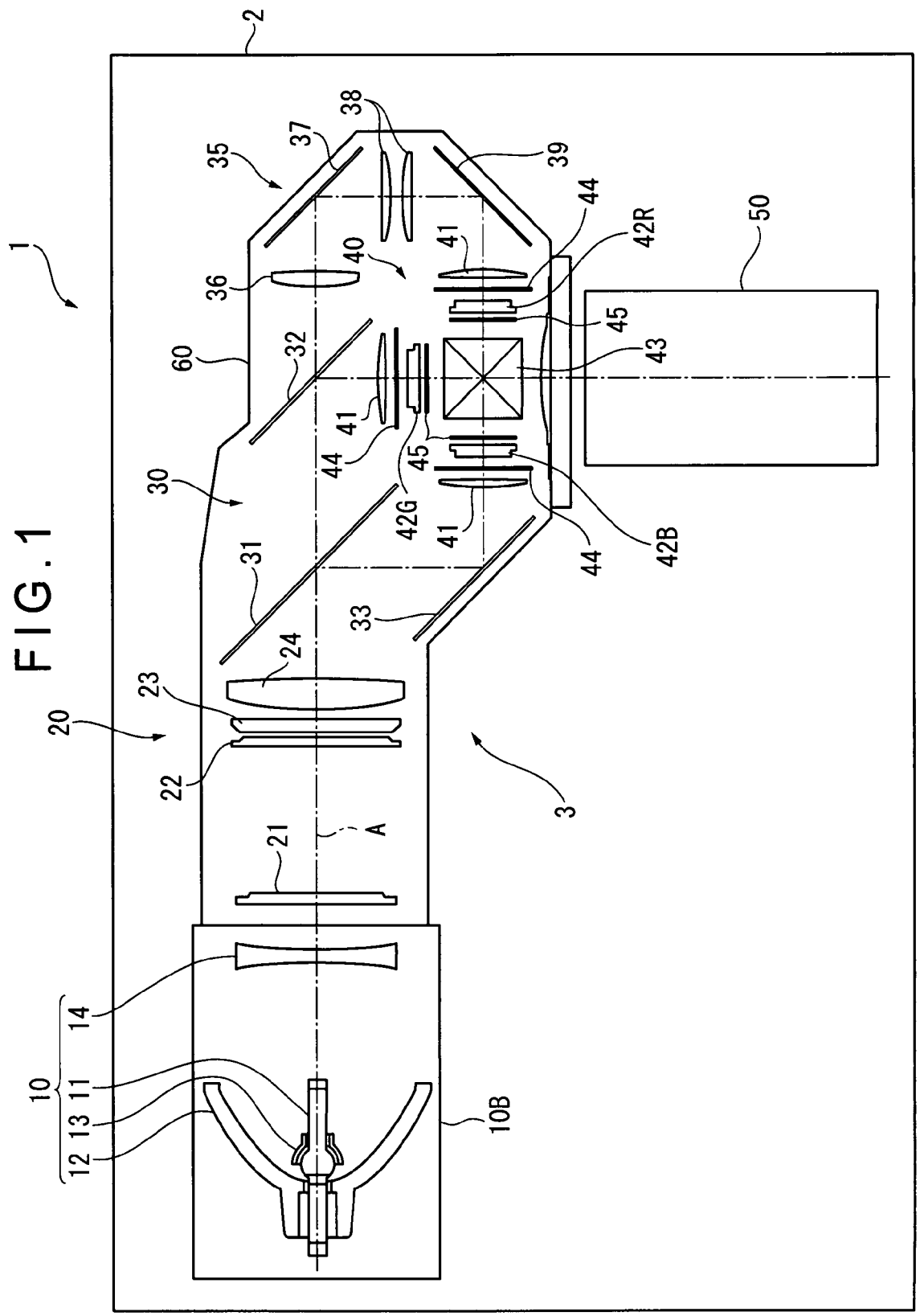
FIG. 1 is a plan view showing an outline of a projector according to an exemplary embodiment of the invention.

An exemplary embodiment of the invention will be described below with reference to the drawings.

Arrangement of Projector

FIG. 1 is a plan view showing an outline of a projector 1 according to an exemplary embodiment of the invention.

The projector 1 is an optical apparatus for modulating a light beam irradiated from a light source in accordance with image information to form an image light and projecting the image light onto a projection plane such as a screen in an enlarged manner. As shown in FIG. 1, the projector 1 includes an exterior casing 2 having approximately a rectangular parallelepiped shape and an optical unit 3 stored in the exterior casing 2.

It should be noted that the exterior casing 2 is provided with a power unit for supplying electricity from the outside to the components of the projector 1, a cooling unit for cooling the inside of the projector 1, a controller for controlling the whole projector 1, and the like (each not shown) in addition to the optical unit 3.

The exterior casing 2 is a product formed of synthetic resin by injection molding or the like. of the exterior casing 2 includes: an upper case constituting a top surface, a front surface, a rear surface, and lateral surfaces of the projector 1; and a lower case constituting a bottom surface, the front surface, the rear surface, and the lateral surfaces of the projector 1. The upper case and the lower case are fixed to each other by screws or the like.

It should be noted that the exterior casing 2 may be formed not only of the synthetic resin but also of other materials such as metal.

An optical unit 3 is disposed in the exterior casing 2 and forms and projects an image light in an enlarged manner. As shown in FIG. 1, the optical unit 3 includes a light source device 10, an integrator illumination optical system 20, a color separating optical system 30, a relay optical system 35, an optical device 40, and a projection optical system 50 serving as a projection optical device. Optical elements constituting those optical systems 20, 30, and 35 and the optical device 40 are positioned and stored in an optical component casing 60 in which a predetermined illumination optical axis A is set.

The light source device 10 irradiates the light beam irradiated from a light source lamp 11 after aligning in a predetermined direction to illuminate the optical device 40. As shown in FIG. 1, the light source device 10 has the light source lamp 11, a main reflection mirror 12 serving as a reflector, a sub-reflection mirror 13, and a parallelizing concave lens 14. The arrangement of the light source device 10 will be described later in detail. The light source device 10 is arranged and stored in a lamp housing 10B connected to the optical component casing 60. By arranging and storing the light source device 10 in the lamp housing 10B, the light source device 10 is positioned at a predetermined position (a position where a central axis of the light beam irradiated from the light source device 10 coincides with the illumination optical axis A set in the optical component casing 60) with respect to the optical component casing 60.

Then, the light beam irradiated from the light source lamp 11 is irradiated toward the front side of the light source device 10 by the main reflection mirror 12 as a convergent light with its irradiation direction aligned. The convergent light is then parallelized by the parallelizing concave lens 14 to be irradiated to the integrator illumination optical system 20.

It should be noted that FIG. 1 shows an arrangement in which the main reflection mirror 12 is an ellipsoidal reflector. When the main reflection mirror 12 is a parabolic reflector, the parallelizing concave lens 14 is omitted.

The integrator illumination optical system 20 is an optical system for splitting the light beam irradiated from the light source device 10 into a plurality of sub-light beams to uniform in-plane illumination of an illumination area. The integrator illumination optical system 20 includes a first lens array 21, a second lens array 22, a polarization converter 23, and a superposing lens 24.

The first lens array 21 has a function of a light-beam splitting optical element for splitting the light beam irradiated from the light source device 10 into the plurality of sub-light beams. The first lens array 21 includes a plurality of small lenses arranged in a matrix from in a plane orthogonal to the illumination optical axis A.

The second lens array 22 is an optical element for condensing the plurality of sub-light beams split by the first lens array 21 described above. The second lens array 22 includes a plurality of small lenses arranged in a matrix form in a plane orthogonal to the illumination optical axis A in the same manner as the first lens array 21.

The polarization converter 23 is an element for aligning polarization directions of the respective sub-light beams split by the first lens array 21 as a linear polarization light substantially in one direction.

Although not shown, the polarization converter 23 is so arranged that polarization separating films and reflection films inclined relative to the illumination optical axis A are alternately arranged. The polarization separating film transmits one polarized light beam out of p- and s-polarized light beams contained in each sub-light beam and reflects the other polarized light beam. The reflected polarized light beam is then bent by the reflecting film and is irradiated in an irradiation direction of the one polarized light beam, namely in the direction along the illumination optical axis A. Some of the irradiated polarized light beam is polarization-converted by a phase plate provided on a light-irradiation surface of the polarization converter 23 and polarizing directions of almost all the polarized light beams are aligned. Since the light beam irradiated from the light source lamp 11 can be aligned as a polarized light beam substantially in one direction by using the polarization converter 23 as described above, utilization efficiency of the source light to be utilized by the optical device 40 can be improved.

The superposing lens 24 is an optical element for condensing the plurality of sub-light beams that have passed through the first lens array 21, the second lens array 22, and the polarization converter 23 to superpose on image forming areas of three liquid crystal panels (described later) of the optical device 40.

The color separating optical system 30 has two dichroic mirrors 31 and 32 and a reflection mirror 33 and separates the plurality of sub-light beams irradiated from the integrator illumination optical system 20 into three color lights of red (R), green (G), and blue (B) by the dichroic mirrors 31 and 32.

The dichroic mirrors 31 and 32 are optical elements in which a wavelength selecting film for reflecting light beam in predetermined wavelength region and transmitting light beam in other wavelength regions is formed on a substrate. The dichroic mirror 31 disposed on an upper stream of the optical path is a mirror for reflecting blue light and transmitting other color lights. The dichroic mirror 32 that is disposed on a downstream of the optical path is a mirror for reflecting green light and transmitting red light.

The relay optical system 35 has an incident-side lens 36, a relay lens 38, and reflection mirrors 37 and 39, and guides the red light that has transmitted by the dichroic mirrors 31 and 32 of the color separating optical system 30 to the optical device 40. It should be noted that the relay optical system 35 is provided in the optical path of the red light to prevent the utilization efficiency of light from decreasing due to light dispersion and the like caused by that length of the optical path of the red light is longer than those of optical paths of other color lights. This arrangement is employed in this exemplary embodiment since the optical path of the red light is longer, but it is also conceivable of using the relay optical system 35 in the optical path of the blue light with the optical path of the blue light lengthened.

The blue light separated by the dichroic mirror 31 described above is bent by the reflection mirror 33 to be fed to the optical device 40 via a field lens 41. The green light separated by the dichroic mirror 32 is also supplied to the optical device 40 via a field lens 41. Further, the red light is condensed and bent by the lenses 36 and 38 and the reflection mirrors 37 and 39 of the relay optical system 35 to be fed to the optical device 40 via a field lens 41. It should be noted that the field lens 41 provided on the upstream of the optical path of each color light of the optical device 40 converts each sub-light beam irradiated from the second lens array 22 into a light beam parallel to the main beam of each sub-light beam.

The optical device 40 modulates the incident light beam in accordance image information to form a color image. The optical device 40 includes liquid crystal panels 42R, 42G, and 42B (42R for the liquid crystal panel on the red light side, 42G for the liquid crystal panel on green light the side and 42B for the liquid crystal panel on blue light the side and a cross dichroic prism 43. It should be noted that indent-side polarization plates 44 are respectively interposed between the field lens 41 and the liquid crystal panels 42R, 42G, and 42B, and irradiation-side polarization plates 45 are respectively interposed between the liquid crystal panels 42R, 42G, and 42B and the cross dichroic prism 43. Each incident color light is optically modulated by the incident-side polarization plates 44, the liquid crystal panels 42R, 42G, and 42B, and the irradiation-side polarization plates 45.

The liquid crystal panels 42R, 42G, and 42B are each formed by a pair of transparent glass substrates with liquid crystal (electrooptic material) sealed therebetween. The liquid crystal panels 42R, 42G, and 42B each modulate polarizing directions of polarized light beams irradiated from the incident-side polarization plate 44 in accordance with given image signals by using a polysilicon TFT (thin film transistor) as a switching element.

The cross dichroic prism 43 is an optical element for combining an optical image modulated for each color light irradiated from the irradiation-side polarization plate 45 to form a color image. The cross dichroic prism 43 has a substantially square shape in plan view with four right-angle prisms attached with each other, and a dielectric multi-layer films are formed on boundaries attaching respective right-angle prisms. One dielectric multi-layer film formed substantially in an X-shape reflects the red light and the other dielectric multi-layer film reflects the blue light. Those dielectric multi-layer films bend red and blue lights so as to align advancing directions thereof with that of the green light.

Then, the color image irradiated from the cross dichroic prism 43 is projected in an enlarged manner by the projection optical system 50 to form a large image on a screen (not shown).

Arrangement of Light Source Device

FIG. 2 is a sectional view showing an outline of a light source device body 10A.

The light source device 10 has the light source lamp 11, the main reflection mirror 12, the sub-reflection mirror 13, the parallelizing concave lens 14, and a heat insulating member 15 as described above. Among these members, the light source lamp 11, the main reflection mirror 12, the sub-reflection mirror 13, and the heat insulating member 15 are combined to compose the light source device body 10A. The light source device body 10A and the parallelizing concave lens 14 are combined in the lamp housing 10B to be disposed at a predetermined position with respect to the optical component casing 60.

As shown in FIG. 2, the light source lamp 11 has a light-emitting tube 111 formed from a quartz glass tube, a pair of electrodes 112 disposed in the light-emitting tube 111, and filler (not shown).

Here, various light source lamps emitting high intensity light may be employed as the light source lamp 11, which may be, for example, a metal halide lamp, a high pressure mercury lamp, and an extra-high pressure mercury lamp.

The light-emitting tube 111 includes: a light-emitting section 1111 that is located at the central part and is bulged in a substantially spherical shape; and a pair of sealing sections 1112 and 1113 extending from both sides of the light-emitting section 1111.

A discharge space having a substantially spherical shape is formed in the light-emitting section 1111. The pair of electrodes 112, mercury, rare gas, and a small amount of halogen are enclosed in the discharge space.

Metal foils 112A made of molybdenum electrically connected to the pair of electrodes 112 are inserted into the pair of sealing sections 1112 and 1113, respectively and are enclosed by glass material and the like. Lead lines 113 serving as electrode extension lines are connected to the metal foils 112A, respectively. The lead lines 113 extend to the outside of the light source lamp 11.

When voltage is applied to the lead lines 113, electric potential arises between the electrodes 112 via the metal foils 112A, and therefore discharge occurs. As a result, an arc image D is generated and the inside of the light-emitting section 1111 emits light as shown in FIG. 2. It should be noted that the light-emitting center will be explained below as a center position O of the arc image D generated between the electrodes 112. The center position O of the arc image D is located substantially at the middle part between the pair of electrodes 112. Further, the center position O of the arc image D is supposed to almost coincide with an intersection of the central axis of the light-emitting tube 111 along a direction in which the sealing sections 1112 and 1113 extend (coincident with the illumination optical axis A of FIG. 2) and a cross section along a plane orthogonal to the illumination optical axis A at the most bulging part of the light-emitting section 1111.

As shown in FIG. 2, the main reflection mirror 12 is an integrally molded product made of light-transmissive glass having a cylindrical neck section 121 into which one sealing section 1112 on a side of a base end of the light source lamp 11 is inserted and a reflecting section 122 having a concave curved plane extending from the neck section 121.

As shown in FIG. 2, the neck section 121 has an insertion hole 123 formed by molding at the center so as to have a substantially cylindrical shape and the sealing section 1112 is disposed at the center of the insertion hole 123.

The reflecting section 122 has a reflection surface 122A that is formed by evaporating a metal thin film on a glass surface having a shape of rotary curve. The reflection surface 122A is a cold mirror for reflecting visible light and transmitting infrared and ultraviolet rays.

The light source lamp 11 disposed on an inner side of the reflecting section 122 of the above-mentioned main reflection mirror 12 is disposed such that the center position O of the arc image D is located in the vicinity of a first focal point F1 of the reflection surface 122A having the shape of rotary curve of the reflecting section 122.

Then, when the light source lamp 11 is lit, a light beam R1 that proceeds toward the main reflection mirror 12 among the light beam irradiated from the light-emitting section 1111 is reflected by the reflection surface 122A of the reflecting section 122 of the main reflection mirror 12 and becomes a converging light converging on a second focal position F2 of the shape of rotary curve as shown in FIG. 2.

Further, as shown in FIG. 2, a light-irradiating front end in the reflecting section 122 extends outward in a direction substantially orthogonal to the central axis (coincident with the illumination optical axis A of FIG. 2) of the light-emitting tube 111 and has a shape of rectangular frame in a plan view. Then, the light-irradiating front end in the reflecting section 122 functions as a positioning plane for positioning the main reflection mirror 12 at predetermined position with respect to the lamp housing 10B.

As shown in FIG. 2, the sub-reflection mirror 13 has a neck section 131 having a substantially cylindrical shape into which the other sealing section 1113 of the light-emitting tube 111 of the light source lamp 11 is inserted and a reflecting section 132 having a substantially spherical shape extending from the neck section 131. The neck section 131 and the reflecting section 132 are integrally formed.

The neck section 131 is a part for fixing the sub-reflection mirror 13 to the light source lamp 11 and the sub-reflection mirror 13 is set to the light source lamp 11 by inserting the sealing section 1113 of the light source lamp 11 into an insertion hole 131A as a cylindrical opening as shown in FIG. 2. An inner peripheral surface of the insertion hole 131A serves as an adhesive surface in which adhesive for fixing the sealing section 1113 is filled. By providing the neck section 131 in the sub-reflection mirror 13, a fixing area for fixing the sub-reflection mirror 13 to the light source lamp 11 is enlarged and the fixing of the sub-reflection mirror 13 to the light source lamp 11 may be properly secured as compared to an arrangement not provided with the neck section 131.

The reflecting section 132 is a reflecting member that covers a substantially front half of the light-emitting section 1111 of the light source lamp 11 in the state where the sub-reflection mirror 13 is set in the light source lamp 11 as shown in FIG. 2.

An inner surface of the reflecting section 132 is a reflection surface 132A formed in a spherical shape corresponding to the spherical surface of the light-emitting section 1111 of the light source lamp 11. It should be noted that the reflection surface 132A is a cold mirror that reflects visible light and transmits infrared and ultraviolet rays similarly to the reflection surface 122A of the main reflection mirror 12.

The sub-reflection mirror 13 described above is made of inorganic materials such as quartz, alumina ceramics, and the like, is the materials being also low thermal expansion materials or high heat conductive materials.

Then, by mounting the sub-reflection mirror 13 described above to the light-emitting tube 111, a light beam R2 irradiated to a side (front side) opposite to the main reflection mirror 12 among the light beam irradiated from the light-emitting section 1111 is focused to the second focal position F2 similarly to the light beam R1 directly incident on the reflection surface 122A of the main reflection mirror 12 from the light source lamp 11.

As described above, the provision of the sub-reflection mirror 13 allows the light beam irradiated from the light source lamp 11 to the side opposite to the main reflection mirror 12 to be reflected to the rear side so as to incident on the reflection surface 122A of the main reflection mirror 12 by the sub-reflection mirror 13. Therefore, the sizes of the main reflection mirror 12 in an optical axis direction and the aperture thereof may be reduced as compared to an arrangement not provided with the sub-reflection mirror 13, for example. That is, the light source device 10 and the projector 1 can be downsized without reducing the utilization efficiency of light and a layout in incorporating the light source device 10 in the projector 1 can be facilitated.

FIG. 3 shows position where the heat insulating member 15 is provided and a flow path F of air circulating in the light source device 10.

The heat insulating member 15 is made of a material that has a relatively small thermal conductivity (smaller than that of the light-emitting tube 111, for example) and that absorbs heat. The heat insulating member 15 is mounted to the light-emitting tube 111 as shown in FIG. 3 and reduces radiation from the light-emitting tube 111.

More specifically, the heat insulating member 15 is made of absorber such as a ceramics coating. The heat insulating member 15 absorbs an incident light beam, converts the light beam into heat, and absorbs radiation heat radiated from the surface of the light-emitting tube 111. Further, even when an amount of radiation from the surface of the heat insulating member 15 becomes large due to forced cooling or the like, temperature of the region where the heat insulating member 15 is provided in the surface of the light-emitting tube 111 (a boundary part of the light-emitting tube 111 and the heat insulating member 15) is kept high because the thermal conductivity of the heat insulating member 15 is small. Thereby, the heat insulating effect of the light-emitting tube 111 may be obtained even when cooling is reinforced. Then, as shown in FIG. 3, the heat insulating member 15 is applied to a part of an outer wall surface (area Ar1) of the light-emitting section 1111 and a part of an outer wall surface (area Ar2) of the sealing section 1112 so as to span the light-emitting section 1111 and the sealing section 1112 on the side opposite to the sealing section 1113 to which the sub-reflection mirror 13 is mounted among the pair of sealing sections 1112 and 1113 in the light-emitting tube 111 and around the whole circumferential direction thereof centering on the illumination optical axis A. Temperature of the heat insulating member 15 increases because the light beam irradiated from the light-emitting section 1111 and illuminating the heat insulating member 15 are absorbed and converted to heat by the heat insulating member 15. Therefore, the radiation heat radiated from the surface of the light-emitting tube 111 is absorbed by the heat insulating member 15 and the temperature of the heat insulating member 15 increases, thereby reducing an amount of heat transferred from the light-emitting section 1111 and the sealing section 1112 to the heat insulating member 15. Further, even when cooling is reinforced, temperature of the region (the boundary part of the light-emitting tube 111 and the heat insulating member 15) to which the heat insulating member 15 is provided on the surface of the light-emitting tube 111 is kept high because the thermal conductivity of the heat insulating member 15 is small.

It should be noted that the areas Ar1 and Ar2 where the heat insulating member 15 is mounted are set as follows.

That is, as shown in FIG. 3, an angle formed by a straight line L1 and the illumination optical axis A on the light-irradiation rear side will be represented by θ1, the straight line L1 connecting a heat insulating critical point P1 of the heat insulating member 15 which is located apart with the largest distance from the illumination optical axis A and located closest to the center position O of the arc image D and the center position O.

Further, as shown in FIG. 3, an angle formed by a straight line L2 and the illumination optical axis A on the light-irradiation rear side will be represented by θ2, the straight line L2 connecting a reflection critical point P2 closest to the illumination optical axis A in a utilized light reflecting area Ar of the main reflection mirror 12 and the center position O.

It should be noted that the utilized light reflecting area Ar is an area set by outer dimensions of the sub-reflection mirror 13 and the light-emitting tube 111, first and second focal distances of the main reflection mirror 12, and the like. More specifically, the utilized light reflecting area Ar is an area for reflecting the light beam radiated from the light-emitting section 1111 to objects to be illuminated (liquid crystal panels 42R, 42G, and 42B) as illuminable utilized light. In other words, the utilized light reflecting area Ar is an area for reflecting as illuminable utilized light the light beam radiated from the light-emitting section 1111 to the objects to be illuminated without being blocked by the light-emitting tube 111 and the sub-reflection mirror 13 even when the light beam radiated from the light-emitting section 1111 are reflected by the main reflection mirror 12. Further, although the utilized light reflecting area Ar is set as an area determined by the outer dimension of the sub-reflection mirror 13 in FIG. 3, it may be determined by the outer dimension of the light-emitting tube 111, e.g., by the outer dimensions of the sealing section 1113.

The heat insulating member 15 is applied to and formed on the light-emitting section 1111 and the sealing section 1112 so as to satisfy a relationship of $\theta 1 \leqq \theta 2$. In the present exemplary embodiment, the heat insulating member 15 is applied to and formed on the light-emitting section 1111 and the sealing section 1112 so as to satisfy a relationship of $\theta 1 = \theta 2$.

Although not shown, a pair of openings is formed in the lamp housing 10B, through which air can flow in/out of the lamp housing 10B. In other words, air flowing through a flow path F within the lamp housing 10B by a cooling fan of the cooling unit described above circulates around the light-emitting tube 111 as shown in FIG. 3 to forcibly cool the light source lamp 11, the sub-reflection mirror 13, the heat insulating member 15, and the like.

The present exemplary embodiment described above provides the following effects.

In the present exemplary embodiment, the heat insulating member 15 is formed on the area Ar1 that is a part of the light-emitting section 1111 of the light-emitting tube 111 and the area Ar2 that is a part of the sealing section 1112 on the side opposite to the sealing section 1113 to which the sub-reflection mirror 13 is mounted. With the arrangement, the heat can be insulated by the heat insulating member 15 on the side opposite to the side on which the sub-reflection mirror 13 is mounted in the light-emitting tube 111. Therefore, even when cooling is reinforced by forced cooling using air flowing through the flow path F to lower the temperature of the light source lamp 11, it becomes possible to prevent the temperature of the side opposite to the side on which the sub-reflection mirror 13 is mounted from dropping more than necessary, and to reduce bias of temperature distribution of the light source lamp 11. Accordingly, it becomes possible to avoid a blackening phenomenon from being generated in the light source lamp 11 and to prolong a life of the light source device 10.

Here, it is verified that the blackening phenomenon is generated around the boundary of the light-emitting section 1111 and the sealing section 1112. The heat insulating member 15 is formed so as to span the light-emitting section 1111 and the sealing section 1112 in this exemplary embodiment, which can effectively suppress the blackening phenomenon of the light source lamp 11.

Further, the heat insulating member 15 is provided in the area Ar1 that is a part of the light-emitting section 1111 where the temperature becomes highest in the light-emitting tube 111. Therefore, it becomes possible for the heat to be effectively insulated on the side opposite to the side on which the sub-reflection mirror 13 is mounted in the light-emitting tube 111 by the heat insulating member 15, and to effectively suppress the drop of the temperature at the side opposite to the side on which the sub-reflection mirror 13 is mounted even when cooling is reinforced by forced cooling using the air flowing through the flow path F.

Further, the temperature of the heat insulating member 15 becomes high and an amount of heat transferred from the light-emitting tube 111 to the heat insulating member 15 can be reduced because the heat insulating member 15 made of the absorber such as the ceramics coating is formed on the area Ar1 that is a part of the light-emitting section 1111 and absorbs the light beam irradiated to the heat insulating member 15 and the radiation heat. Further, even when the heat radiation from the surface of the heat insulating member 15 increases due to forced cooling or the like, it is possible to obtain the heat insulating effect of the region where the heat insulating member 15 is provided on the surface of the light-emitting tube 111 (the boundary part of the light-emitting tube 111 and the heat insulating member 15) because the thermal conductivity of the heat insulating member 15 is small. Therefore, even when cooling is reinforced by forced cooling by air flowing through the flow path F in the light-emitting tube 111, it is possible to further effectively suppress the reduction of temperature at the side opposite to the side on which the sub-reflection mirror 13 is mounted.

Accordingly, it is possible to effectively prevent the temperature of the side opposite to the side on which the sub-reflection mirror 13 is mounted from dropping more than necessary, and to effectively reduce the bias of the temperature distribution of the light source lamp 11 even when cooling is reinforced to lower the temperature of the light source lamp 11.

Further, for example, because the heat insulating member 15 is made of the ceramic coating body or the like and is applied to and formed on the light-emitting tube 111, the structure for mounting the heat insulating member to the light-emitting tube 111 is not complicated as compared to an arrangement for mechanically mounting the heat insulating member to the light-emitting tube 111, and therefore the heat insulating member 15 can be readily formed and the light source device 10 can be readily manufactured.

Incidentally, when the heat insulating member is provided to the light-emitting tube 111 so as to satisfy the relationship of $\theta_1 > \theta_2$ that does not satisfy the relationship of $\theta_1 \leq \theta_2$ described above, the utilized light among the light beam irradiated from the light-emitting section 1111 is blocked by the heat insulating member and improvement of utilization efficiency of the light irradiated from the light source device 10 may be impeded.

According to the present exemplary embodiment, since the heat insulating member 15 is provided to the light-emitting tube 111 so as to satisfy the relationship of $\theta_1 = \theta_2$, the utilized light among the light beam irradiated from the light-emitting section 1111 is not blocked by the heat insulating member 15, and improvement of the utilization efficiency of the light irradiated from the light source device 10 is not impeded.

While the invention has been explained using the preferred exemplary embodiment above, the invention is not limited to the exemplary embodiment and may include modifications and improvements in design as long as it does not depart from the scope of the invention.

In the above exemplary embodiment, the heat insulating member which absorbs heat and has the thermal conductivity smaller than that of a base material of the light-emitting tube 111 is described. However, the invention is not limited thereto and it is possible to employ a heat insulating member having small thermal conductivity while having low heat absorptivity or a heat insulating member having high heat absorptivity while having thermal conductivity higher than that of the base material of the light-emitting tube 111, where size and thickness thereof may be appropriately set to obtain a heat insulating member having a desirable heat insulating effect.

Although the main reflection mirror 12 is the ellipsoidal reflector in the above exemplary embodiment, the invention is not limited thereto. The main reflection mirror 12 may be a parabolic reflector that reflects the light beam irradiated from the light source lamp 11 as substantially parallelized light.

Further, although the heat insulating member 15 is formed of the absorber such as the ceramics coating and is formed as a film (heat insulating film) in the above exemplary embodiment, the heat insulating member 15 is not limited thereto. For example, the heat insulating member may be an absorber such as ceramics to be mechanically connected to the light-emitting tube 111. Further, the heat insulating member is not limited to the absorber and may be formed of any material as far as it can reduce the amount of heat loss of the light-emitting tube 111 by the mounting the heat insulating member to the light-emitting tube 111.

Although the heat insulating member 15 is disposed in the areas Ar1 and Ar2 of the light-emitting tube 111 in the above exemplary embodiment, the invention is not limited thereto. The heat insulating member may be disposed in any position as long as it is disposed in at least one of the sealing section 1112 on the side opposite to the sealing section 1113 to which the sub-reflection mirror 13 is mounted and the light-emitting section 1111. For example, the heat insulating member may be disposed only in the area Ar1, only in the area Ar2, or in the whole sealing section 1112. Further, although the heat insulating member 15 is disposed in the areas Ar1 and Ar2 along the whole circumferential direction centering on the illumination optical axis A, it may be disposed only in a part of the circumferential direction, and not the whole circumferential direction, for example. Further, although the heat insulating member 15 us provided so as to satisfy the relationship of θ1=θ2, the invention is not limited thereto. The heat insulating member 15 may be disposed so as to satisfy the relationship of θ1≦θ2.

Although the light source device 10 provided with the sub-reflection mirror 13 is explained in the above exemplary embodiment, the invention is not limited thereto and the light source device 10 may not include the sub-reflection mirror 13.

Although only the arrangement of the projector 1 using the three liquid crystal panels 42R, 42G, and 42B is explained in the above exemplary embodiment, the invention is also applicable to a projector using only one liquid crystal panel, a projector using two liquid crystal panels, or a projector using four or more liquid crystal panels.

Although the light-transmissive liquid crystal panel having different light-incident plane and light-irradiation side is used in the above exemplary embodiment, a reflection-type liquid crystal panel having the same light-incident plane and light-irradiation side may be used.

Although the liquid crystal panel is used as an optical modulator in the above exemplary embodiment, an optical modulator other than the liquid crystal panel, such as a device using a micro-mirror may be used. In this case, polarization plates of the light-incident side and light-irradiation side may be eliminated.

Although only a front-type projector for projecting an image in a direction for observing the screen is explained in the above exemplary embodiment, the invention is also applicable to a rear-type projector for projecting an image in a direction opposite to the direction for observing the screen.

Although the light source device of the invention is used for the projector in the above exemplary embodiment, the invention is not limited thereto. The light source device of the invention may be used for other optical apparatuses.

Although the best mode for carrying out the invention has been disclosed in the above description, the invention is not limited thereto. In other words, although the invention has been specifically illustrated and explained in connection with the specific exemplary embodiment, those skilled in the art may add various changes in structure including specific shape, material, number, and the like to the above exemplary embodiment without departing from the scope of the technical idea and the object of the invention.

Accordingly, the description defining the shape, material, and the like above is an illustrative description for facilitating the understanding of the invention, and do not limit the invention by any means. Therefore, description by names of the parts whose partial or whole definition, such as shape and material, are removed are also construed to be included in the invention.

The light source device of the invention enables the life of the light source lamp to be prolonged by reducing the bias of the temperature distribution of the light source lamp and avoiding the drop of illuminance and breakdown of the light source lamp in the structure in which the sub-reflection mirror is mounted to the light source lamp. Accordingly, the light source device may be utilized as a light source device of a projector used in a home theater or for presentations.

What is claimed is:

1. A light source device, comprising:
   a light source lamp having a light-emitting tube with a discharge space and a pair of electrodes disposed in the discharge space of the light-emitting tube;
   a reflector extending in a substantially concave shape in section, the reflector reflecting a light beam irradiated from the light source lamp; and
   a sub-reflection mirror having a reflection surface that is disposed to face a reflection surface of the reflector, the sub-reflection mirror reflecting a part of the light beam irradiated from the light source lamp toward the discharge space, wherein
   the light-emitting tube has a light-emitting section having the discharge space therein and sealing sections provided on both sides of the light-emitting section,
   the sub-reflection mirror is formed in a shape of a bowl that covers the light-emitting section of the light-emitting tube, the sub-reflection mirror having an opening for mounting the sub-reflection mirror to the light-emitting tube by allowing one of the sealing sections of the light-emitting tube to be inserted thereinto, and
   a heat insulating member is provided to at least a part of the light-emitting section and the other one of the sealing sections of the light-emitting tube.

2. The light source device according to claim 1, wherein
   the heat insulating member is provided to the at least a part of the light-emitting section and the other one of the sealing sections of the light-emitting tube so as to satisfy a relationship of θ1≦θ2,
   where θ1 represents an angle formed by a straight line and a central axis of the light beam irradiated from the light source lamp on a light-irradiation rear side, the straight line connecting a light-emitting center of the light source lamp and a heat insulating critical point of the heat insulating member, the heat insulating critical point located apart with a largest distance from the central axis of the light beam irradiated from the light source device and located closest to the light-emitting center in the heat insulating member, and
   θ2 represents an angle formed by a straight line and the central axis on the light-irradiation rear side, the straight line connecting a reflection critical point which is located closest to the central axis in a utilized light reflecting area of the reflector and the light-emitting center.

3. The light source device according to claim 2, wherein the heat insulating member is provided at least to the light-emitting section.

4. The light source device according to claim 1, wherein the heat insulating member absorbs an incident light beam and radiation heat.

5. The light source device according to claim 1, wherein the heat insulating member has a thermal conductivity smaller than that of the light-emitting tube.

6. A projector, comprising:
   a light source device;
   an optical modulator that modulates a light beam irradiated from the light source device in accordance with image information; and
   a projection optical device that projects the light beam modulated by the optical modulator in an enlarged manner, wherein
   the light source device includes:
   a light source lamp having a light-emitting tube with a discharge space and a pair of electrodes disposed in the discharge space of the light-emitting tube;
   a reflector for extending in a substantially concave shape in section, the reflector reflecting the light beam irradiated from the light source lamp; and
   a sub-reflection mirror having a reflection surface that is disposed to face a reflection surface of the reflector, the sub-reflection mirror reflecting a part of the light beam irradiated from the light source lamp toward the discharge space, the light-emitting tube having a light-emitting section having a discharge space therein and sealing sections provided on both sides of the light-emitting section, the sub-reflection mirror being formed in a shape of a bowl that covers the light-emitting section of the light-emitting tube, the sub-reflection mirror having an opening for mounting the sub-reflection mirror to the light-emitting tube by allowing one of the sealing sections of the light-emitting tube to be inserted thereinto, and a heat insulating member being provided to at least a part of the light-emitting section and the other one of the sealing sections of the light-emitting tube.

7. The projector according to claim 6, wherein the heat insulating member is provided to the at least a part of the light-emitting section and the other one of the sealing sections of the light-emitting tube so as to satisfy a relationship of $\theta 1 \leq \theta 2$, where $\theta 1$ represents an angle formed by a straight line and a central axis of the light beam irradiated from the light source lamp on a light-irradiation rear side, the straight line connecting a light-emitting center of the light source lamp and a heat insulating critical point of the heat insulating member, the heat insulating critical point located apart with a largest distance from the central axis of the light beam irradiated from the light source device and located closest to the light-emitting center in the heat insulating member, and $\theta 2$ represents an angle formed by a straight line and the central axis on the light-irradiation rear side, the straight line connecting a reflection critical point which is located closest to the central axis in a utilized light reflecting area of the reflector and the light-emitting center.

8. The projector according to claim 7, wherein the heat insulating member is provided at least to the light-emitting section.

9. The projector according to claim 6, wherein the heat insulating member absorbs an incident light beam and radiation heat.

10. The projector according to claim 6, wherein the heat insulating member has a thermal conductivity smaller than that of the light-emitting tube.

* * * * *